United States Patent
An et al.

(10) Patent No.: US 10,261,166 B2
(45) Date of Patent: Apr. 16, 2019

(54) METHOD AND APPARATUS FOR VALIDATING LOCATION OF VESSEL

(71) Applicant: ELECTRONICS AND TELECOMMUNICATIONS RESEARCH INSTITUTE, Daejeon (KR)

(72) Inventors: Gae Il An, Daejeon (KR); Hyeok Chan Kwon, Daejeon (KR); Kwang Il Lee, Daejeon (KR); Sok Joon Lee, Sejong (KR); Do Young Chung, Daejeon (KR); Byung Ho Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 282 days.

(21) Appl. No.: 15/250,399

(22) Filed: Aug. 29, 2016

(65) Prior Publication Data
US 2017/0219679 A1 Aug. 3, 2017

(30) Foreign Application Priority Data
Feb. 3, 2016 (KR) .................. 10-2016-0013690

(51) Int. Cl.
*G01S 5/02* (2010.01)

(52) U.S. Cl.
CPC .......... *G01S 5/0252* (2013.01); *G01S 5/0215* (2013.01)

(58) Field of Classification Search
CPC ........ G01S 5/0252; G01S 5/0215; G01S 5/14; G01S 5/02; G01S 11/02; G01S 11/06; G01S 11/04
USPC ........................................... 342/458
See application file for complete search history.

(56) References Cited

U.S. PATENT DOCUMENTS

| | | | |
|---|---|---|---|
| 9,026,144 B2 | 5/2015 | Wuoti et al. | |
| 2009/0156139 A1 | 6/2009 | Lee et al. | |
| 2010/0033363 A1 | 2/2010 | Lee et al. | |
| 2011/0316743 A1* | 12/2011 | Chantz | G01S 5/04 342/367 |
| 2012/0299776 A1 | 11/2012 | Lee et al. | |

FOREIGN PATENT DOCUMENTS

| KR | 10-2013-0067362 A | 6/2013 |
|---|---|---|
| WO | WO 2004/019301 A1 | 3/2004 |

* cited by examiner

*Primary Examiner* — Harry K Liu

(57) ABSTRACT

A vessel location validation method and apparatus are provided. The vessel location validation method includes receiving a wireless signal from a vessel, acquiring location information of the vessel from the received wireless signal, and determining whether the acquired location information is valid based on the acquired location information and a signal strength of the received wireless signal.

13 Claims, 6 Drawing Sheets

METHOD AND APPARATUS FOR VALIDATING LOCATION OF VESSEL

CROSS-REFERENCE TO RELATED APPLICATION

This application claims the benefit of Korean Patent Application No. 10-2016-0013690, filed on Feb. 3, 2016, in the Korean Intellectual Property Office, the disclosure of which is incorporated herein by reference.

BACKGROUND

1. Field of the Invention

Embodiments relate to a method and apparatus for validating a location of a vessel.

2. Description of the Related Art

In the ocean, vessels may periodically transmit location information of the vessels to a neighboring vessel or a vessel traffic control center using a location transmission system, to prevent a collision between vessels and to easily track a location of a sunken vessel.

However, the biggest issue of a current location transmission system is forging of location information. For example, illegal fishing boats hide locations of the illegal fishing boats to perform a fishing operation in an area in which the fishing operation is prohibited, and commit piracy and smuggling.

Also, illegal vessels intentionally change locations of the illegal vessels to elude police pursuit. In particular, a malicious user may intentionally transmit forged location information to neutralize an effect of the location transmission system.

Accordingly, an issue, for example, a decrease in reliability of a system due to forged location information may occur.

SUMMARY

An aspect is to effectively validate location information transmitted by a location transmission system of a vessel by analyzing a moving distance of the vessel and by determining whether a strength of a received signal is abnormal, to determine whether the location information is reliable.

Hereinafter, characteristic configurations of the present disclosure for achieving the above aspect and realizing characteristic effects of the present disclosure are described below.

According to an aspect, there is provided a vessel location validation method including receiving a wireless signal from a vessel, acquiring location information of the vessel from the received wireless signal, and determining whether the acquired location information is valid, based on the acquired location information and a signal strength of the received wireless signal.

The determining of whether the acquired location information is valid may include comparing values of a change in the acquired location information and comparing values of a change in the signal strength, and determining whether the acquired location information is valid based on a result of the comparing.

The comparing of the values may include comparing the values of the change in the acquired location information based on a moving distance of the vessel according to a period.

The comparing of the values may include comparing a distance between locations corresponding to the change in the acquired location information to a threshold of a moving distance of the vessel.

The determining of whether the acquired location information is valid may include, when the distance is greater than or equal to the threshold, determining that the acquired location information is invalid.

The determining of whether the acquired location information is valid may include, when the values of the change in the signal strength are greater than or equal to a threshold that is based on the change in the acquired location information, determining that the acquired location information is invalid.

The acquiring of the location information may include decoding a message included in the received wireless signal and extracting a location and identification information of the vessel. The message may be an automatic identification system (AIS) message.

The acquiring of the location information may include generating a moving route corresponding to the extracted identification information based on stored location information.

The acquiring of the location information may include matching the signal strength to location information of the vessel corresponding to the extracted identification information.

According to another aspect, there is provided a vessel location validation method including receiving a wireless signal from a vessel, acquiring location information of the vessel from the received wireless signal, determining whether a moving route of the vessel is abnormal based on the acquired location information, and determining whether the location information is valid based on whether the moving route is abnormal.

The determining of whether the moving route is abnormal may include, when a moving distance of the vessel during a predetermined period of time is analyzed to exceed a maximum moving distance of the vessel during the predetermined period of time, determining that the moving route is abnormal.

The determining of whether the moving route is abnormal may include, when a signal strength of the received wireless signal rapidly changes even though a location of the vessel remains unchanged, when the signal strength remains unchanged even though the location of the vessel changes, when the signal strength increases even though a distance to the vessel increases, or when the signal strength decreases even though the distance to the vessel decreases, determining that the moving route is abnormal.

The signal strength may be extracted by measuring a received signal strength indicator (RSSI) value of the received wireless signal. The moving route may be stored as history information including a reception time at which the location information is received, identification information of the vessel, the location information of the vessel, and the extracted signal strength.

The determining of whether the location information is valid may include, when an abnormal degree of a moving distance of the vessel and an abnormal degree of a signal strength of the received wireless signal are greater than or equal to preset thresholds, determining that the location information is invalid.

According to another aspect, there is provided a vessel location validation apparatus including a wireless signal receiver configured to receive a wireless signal from a vessel, a vessel location acquirer configured to acquire location information of the vessel from the received wireless signal, and a vessel location validity determiner configured to determine whether the acquired location information is valid, based on the acquired location information and a signal strength of the received wireless signal.

According to another aspect, there is provided a vessel location validation method to to validate location information received from a vessel, the vessel location validation method including receiving a wireless signal from the vessel, decoding a message included in the wireless signal and extracting a vessel identifier (ID) and the location information, extracting a signal strength of the received wireless signal from the received wireless signal, storing location history information of the vessel, determining whether a moving route of the vessel is abnormal, determining whether the signal strength is abnormal, and determining validity of the location information based on results of the determining.

The extracting of the signal strength may include extracting signal strength information from the wireless signal by measuring an RSSI value of the wireless signal.

The storing of the location history information may include storing location history information including a reception time at which the location information is received, the vessel ID, the location information, and the extracted signal strength.

The determining of whether the moving route is abnormal may include, when a moving distance of the vessel during a predetermined period of time is analyzed to be greater than a maximum moving distance, determining that the moving route is abnormal.

The determining of whether the signal strength is abnormal may include, when the signal strength rapidly changes even though a location of the vessel remains unchanged, when the signal strength remains unchanged even though the location of the vessel changes, when the signal strength increases even though the vessel moves away from a current location, or when the signal strength decreases even though the vessel approaches the current location, determining that the signal strength is abnormal.

The determining of the validity of the location information may include, when an abnormal degree of a moving distance of the vessel and an abnormal degree of the signal strength are greater than or equal to preset thresholds, determining that location information is invalid.

According to another aspect, there is provided a vessel location validation apparatus for validating location information of a vessel received from the vessel, the vessel location validation apparatus including a vessel location receiver configured to receive a wireless signal including the location information, a signal strength extractor configured to extract a signal strength of the received wireless signal, a vessel moving route storage configured to store the location information and the extracted signal strength, and a vessel location verifier configured to verify the location information by determining whether a moving route of the vessel is abnormal and whether the signal strength is abnormal.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
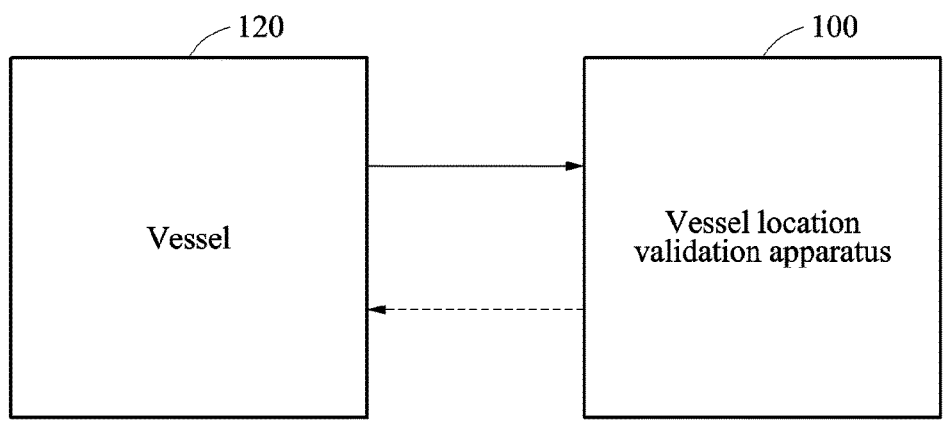
FIG. 1 illustrates a concept of a method of vessel location validation method according to an embodiment.

Reference will now be made in detail to embodiments of the present disclosure, examples of which are illustrated in the accompanying drawings, wherein like reference numerals refer to the like elements throughout. Embodiments are described below to explain the present disclosure by referring to the figures.

FIG. 1 illustrates a concept of a method of vessel location validation method according to an embodiment.

Referring to FIG. 1, an entire system may include a vessel location validation apparatus 100 and a vessel 120. The vessel location validation apparatus 100 may be, for example, a server installed in a vessel traffic control center, however, there is no limitation thereto. The vessel location validation apparatus 100 may include at least one of a processor, a data transceiver and a memory. Also, the vessel location validation apparatus 100 may be, for example, another vessel, or a computing device installed in the other vessel, however, there is no limitation thereto.

To determine whether location information received from a location transmission system of a vessel is reliable, the vessel location validation apparatus 100 may perform a vessel location validation method for effectively validating the location information by analyzing a moving distance of the vessel and determining whether a strength of a received signal is abnormal. Also, the vessel location validation apparatus 100 may transmit information about the vessel 120 to another apparatus connected to the vessel location validation apparatus 100 based on a validation result. For example, the vessel location validation apparatus 100 may transmit, to the other apparatus, information indicating that location information received from the vessel 120 is invalid or unreliable. The vessel location validation apparatus 100 may also transmit, to the other apparatus, information indicating that location information received from the vessel 120 is valid or reliable, depending on circumstances.

For example, the vessel location validation apparatus 100 may be installed in a vessel other than the vessel 120, and may include a location transmission system. In this example, the vessel location validation apparatus 100 may transmit a location of the vessel in which the vessel location validation apparatus 100 is installed to the vessel 120 using a wireless signal.

Figure 2:
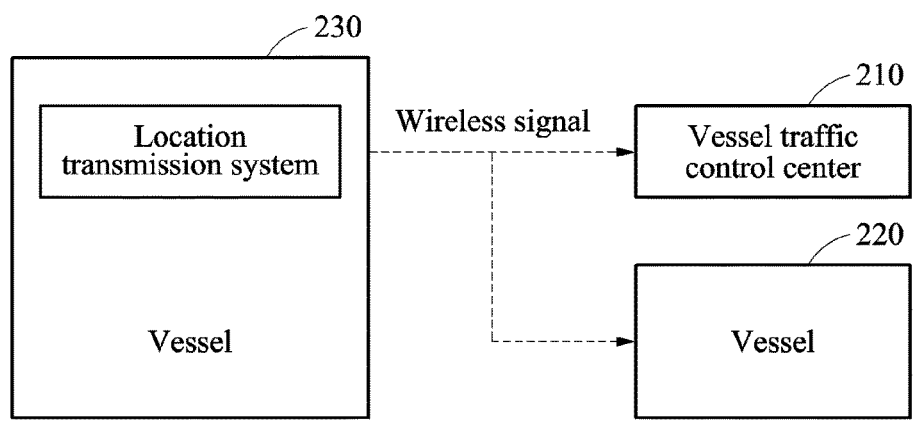
FIG. 2 illustrates a vessel location validation method according to an embodiment.

FIG. 2 illustrates a vessel location validation method according to an embodiment.

Referring to FIG. 2, a location transmission system may transmit location information of a vessel 230 in which the location transmission system is installed. For example, the vessel 230 may periodically transmit the location information of the vessel 230 to a neighboring vessel 220 or a vessel traffic control center 210, to prevent a collision between vessels in the ocean and to easily track a location of a sunken vessel. In this example, a vessel location validation apparatus may be installed in the vessel 220 or the vessel traffic control center 210. Also, the vessel location validation apparatus may be installed in the vessel 230 depending on circumstances.

The location transmission system used by the vessel 230 to transmit the location information of the vessel 230 to an external device may include at least one of an automatic identification system (AIS) that is configured to automatically identify a vessel, a vessel-Pass (V-Pass) system, a long-range identification and tracking (LRIT) system. For example, the MS may be mainly installed in a passenger boat or a freighter. In this example, the location transmission system may periodically transmit a location of the vessel 230 using a signal received from a global positioning system (GPS) antenna to the vessel traffic control center 210 or the vessel 220 wirelessly via a very high frequency (VHF) antenna. The V-PASS system may be installed in a fishing vessel. The LRIT system may be a system configured to collect long-range location information of a foreign vessel and transmit the long-range location information to countries directly involved.

In an example, the vessel location validation apparatus may include at least one of a system for calculating an optimal waterway based on location information, a system for notifying a collision between vessels in advance and a vessel monitoring system. In another example, depending on circumstances, the vessel location validation apparatus may operate in connection to at least one of a system for calculating an optimal waterway based on location information, a system for notifying a collision between vessels in advance and a vessel monitoring system, and thus it is possible to increase reliability of a system by preventing the reliability from decreasing due to forged location information received from a vessel.

The vessel location validation apparatus may verify whether location information provided by a marine vessel is reliable, and may perform a vessel location validation method to effectively validate location information received from a location transmission system of a vessel.

Figure 3:
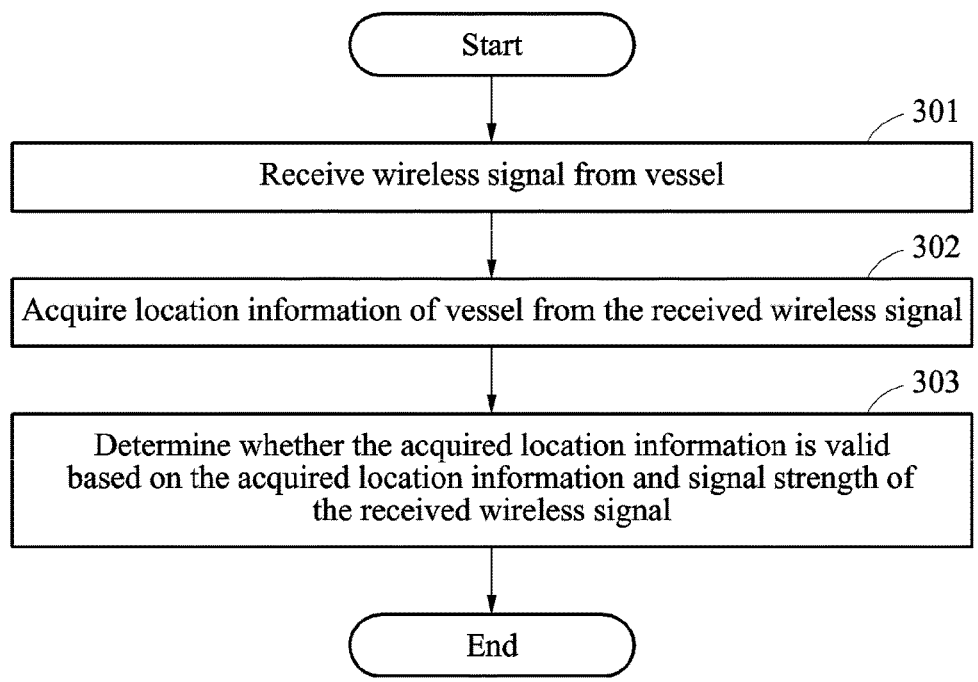
FIG. 3 is a flowchart illustrating an example of a vessel location validation method according to an embodiment.

FIG. 3 is a flowchart illustrating an example of a vessel location validation method according to an embodiment.

The vessel location validation method of FIG. 3 may be performed by a vessel location validation apparatus.

Referring to FIG. 3, in operation 301, the vessel location validation apparatus may receive a wireless signal from a vessel.

In operation 302, the vessel location validation apparatus may acquire location information of the vessel from the received wireless signal. For example, the vessel location validation apparatus may extract a location and identification information of the vessel by decoding a message included in the received wireless signal and. The message included in the received wireless signal may be, for example, an AIS message. Also, the vessel location validation apparatus may generate a moving route corresponding to the extracted identification information based on stored location information of the vessel. The vessel location validation apparatus may match a signal strength of the received wireless signal to location information of the vessel corresponding to the extracted identification information. The vessel location validation apparatus may measure the signal strength using physical layer equipment of the vessel location validation apparatus.

For example, when a first vessel is located at a location (x, y), the vessel location validation apparatus may store "z" decibel milliwatt (dBm) as a value of a strength of a received signal, and may also store an information providing time varying depending on a period.

In operation 303, the vessel location validation apparatus may determine whether the acquired location information is valid based on the acquired location information and the signal strength.

The vessel location validation apparatus may compare values of a change in the acquired location information and values of a change in the signal strength. The vessel location validation apparatus may compare the values of the change in the acquired location information based on a moving distance of the vessel according to a period. Also, the vessel location validation apparatus may compare a distance between locations corresponding to the change in the acquired location information to a threshold of the moving distance of the vessel.

For example, when a first vessel is located at a location (x1, y1) during a first period and when the first vessel is located at a location (x2, y2) during a second period, the vessel location validation apparatus may calculate a distance between the locations (x1, y1) and (x2, y2). The vessel location validation apparatus may compare the calculated distance to a threshold.

The vessel location validation apparatus may determine whether the acquired location information is valid based on a result obtained by the comparing. For example, when the distance between the locations corresponding to the change in the acquired location information is greater than or equal to the threshold of the moving distance, the vessel location validation apparatus may determine that the acquired location information is invalid. When the values of the change in the signal strength are greater than or equal to a threshold that is based on the change in the acquired location information, the vessel location validation apparatus may determine that the acquired location information is invalid.

For example, the vessel location validation method may include the following operations.

The vessel location validation apparatus may receive a wireless signal from a vessel.

The vessel location validation apparatus may acquire location information of the vessel from the received wireless signal.

The vessel location validation apparatus may determine whether a moving route of the vessel is abnormal based on the acquired location information. In an example, when a moving distance of the vessel during a predetermined period of time is analyzed to exceed a maximum moving distance of the vessel during the predetermined period of time, the vessel location validation apparatus may determine that the moving route of the vessel is abnormal.

In another example, when the signal strength of the received wireless signal rapidly changes even though a location of the vessel remains unchanged, or when the signal strength remains unchanged even though the location of the vessel changes, the vessel location validation apparatus may determine that the moving route of the vessel is abnormal.

In still another example, when the signal strength increases even though a distance to the vessel increases, or when the signal strength decreases even though the distance to the vessel decreases, the vessel location validation apparatus may determine that the moving route of the vessel is abnormal. In this example, the signal strength may be extracted by measuring a received signal strength identifier (RSSI) of the received wireless signal, and the moving route may be stored as history information including a reception time at which the location information is received, identification information of the vessel, the location information and the extracted signal strength.

The vessel location validation apparatus may determine whether the location information is valid based on whether the moving route is abnormal. For example, when an abnormal degree of a moving distance of the vessel and an abnormal degree of the signal strength are greater than or equal to preset thresholds, the vessel location validation apparatus may determine that the location information is invalid.

Figure 4:
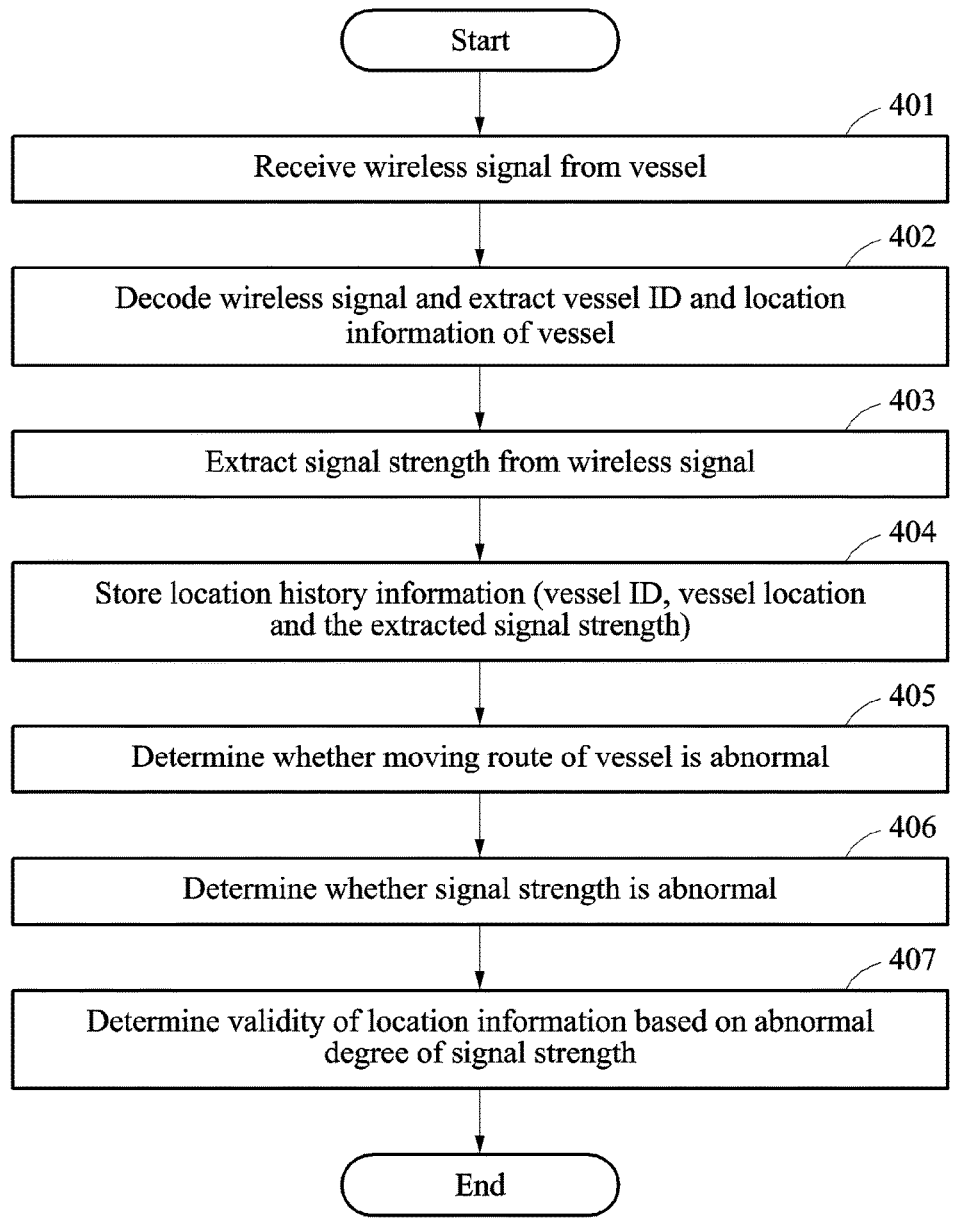
FIG. 4 is a flowchart illustrating another example of a vessel location validation method according to an embodiment.

FIG. 4 is a flowchart illustrating another example of a vessel location validation method according to an embodiment.

The vessel location validation method of FIG. 4 may be performed by a vessel location validation apparatus.

When location information of a vessel is received from the vessel, the vessel location validation apparatus may perform the vessel location validation method, to validate the received location information.

Referring to FIG. 4, in operation 401, the vessel location validation apparatus may receive a wireless signal from the vessel. In operation 402, the vessel location validation apparatus may decode a message included in the wireless signal and may extract a vessel identifier (ID) and the location information. In operation 403, the vessel location validation apparatus may extract a signal strength of the received wireless signal from the received wireless signal. In operation 404, the vessel location validation apparatus may store location history information of the vessel.

For example, when the wireless signal is received from the vessel, the vessel location validation apparatus may decode the message included in the wireless signal and may extract the vessel ID and the location information. The vessel location validation apparatus may extract signal strength information from the wireless signal by measuring an RSSI value of the wireless signal. The vessel location validation apparatus may store the location history information in a form of <a reception time at which the location information is received, the vessel ID of a vessel that transmits the location information, the location information, and the extracted signal strength information> so that a moving route of the vessel and the signal strength may be tracked.

In operation 405, the vessel location validation apparatus may determine whether the moving route of the vessel is abnormal. In operation 406, the vessel location validation apparatus may determine whether the signal strength is abnormal. In operation 407, the vessel location validation apparatus may determine validity of the location information based on determination results of operations 405 and 406.

For example, the vessel location validation apparatus may analyze a moving distance of a vessel that transmits location information of the vessel. In this example, the vessel location validation apparatus may calculate a maximum moving distance of the vessel based on a maximum speed of the vessel. When a moving distance of the vessel during a predetermined period of time is greater than the maximum moving distance, the vessel location validation apparatus may determine whether the moving distance is abnormal.

The vessel location validation apparatus may analyze a correlation between a signal strength of a received signal and location information of a vessel that transmits the location information. A received signal strength measured in a wireless signal reception system may be inversely proportional to a distance between a wireless signal transmission system and the wireless signal reception system. For example, the vessel location validation apparatus may determine that the signal strength is abnormal based on a result of the analyzing of the correlation between the signal strength and the location information.

For example, when the signal strength is determined to rapidly change even though a location of a vessel remains unchanged, the vessel location validation apparatus may determine that the signal strength is abnormal. In another example, when the signal strength remains unchanged even though the location of the vessel changes, the vessel location validation apparatus may determine that the signal strength is abnormal. In still another example, when the signal strength increases even though the vessel moves away from a current location, the vessel location validation apparatus may determine that the signal strength is abnormal. In yet another example, when the signal strength decreases even though the vessel approaches a current location, the vessel location validation apparatus may determine that the signal strength is abnormal.

When an abnormal degree of a moving distance of the vessel and an abnormal degree of the signal strength are greater than or equal to preset thresholds, the vessel location validation apparatus may determine that the location information is invalid.

Figure 5:
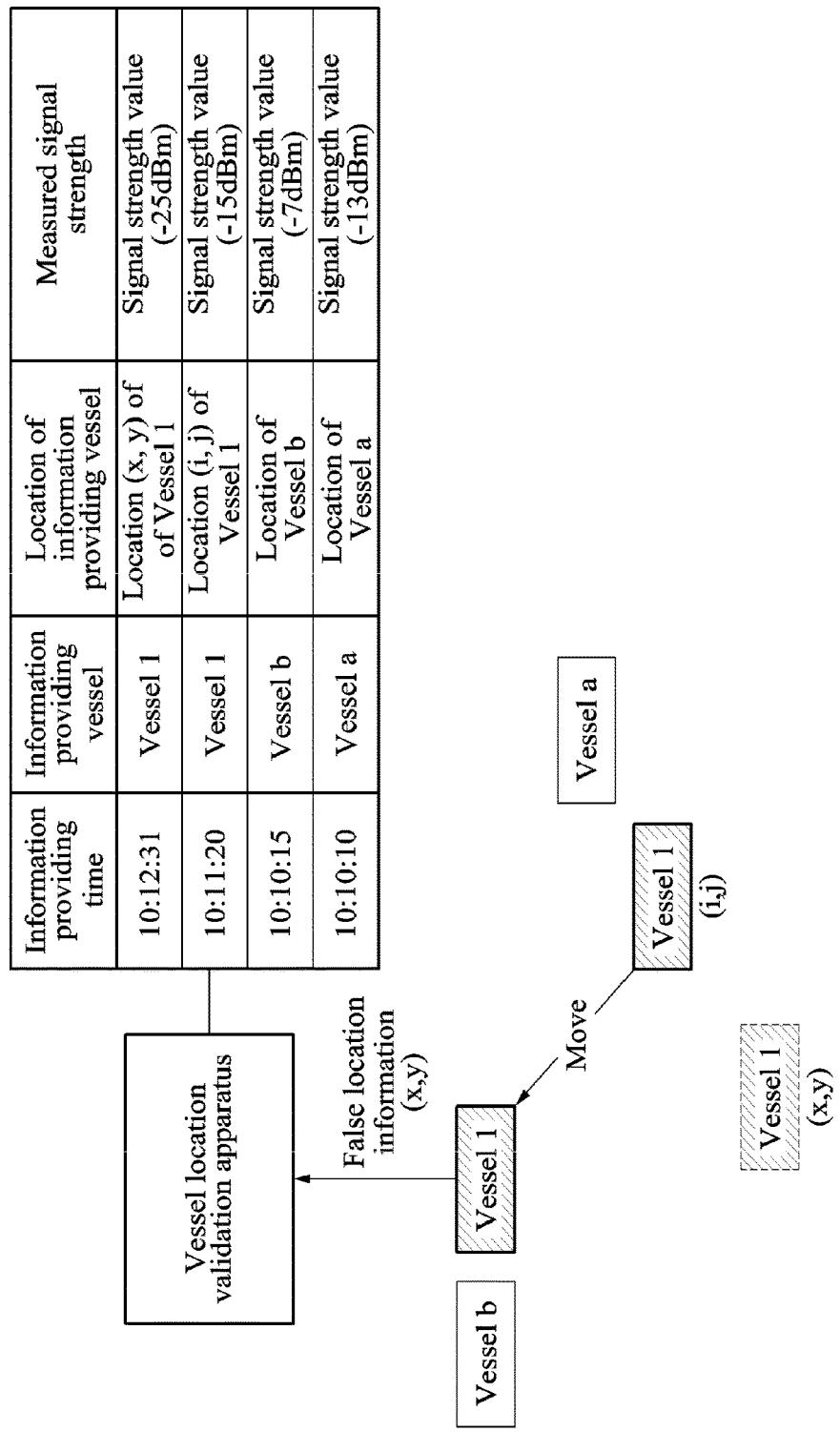
FIG. 5 illustrates a vessel location validation method based on a strength of a received signal according to an embodiment.

FIG. 5 illustrates a vessel location validation method based on a strength of a received signal according to an embodiment.

In FIG. 5, the vessel location validation method may be performed to validate location information received from a vessel.

For example, a vessel 1 may broadcast false location information, for example, a location (x, y), using a wireless signal. In this example, a vessel location validation apparatus located in a vessel traffic control center and configured to verify a location of a vessel may receive the wireless signal from the vessel 1. The vessel location validation apparatus may store, in a vessel moving route storage, an ID and location information of the vessel 1 that transmits the wireless signal and a signal strength extracted from the wireless signal.

To validate location information received from a vessel, the vessel location validation apparatus may perform a vessel location validation method. The vessel location validation apparatus may analyze a correlation between a vessel moving route and a strength of a received signal. For example, even though the vessel 1 approaches the vessel traffic control center or the vessel location validation apparatus, the vessel location validation apparatus may recognize that the signal strength abnormally decreases from −15 dBm to −25 dBm. In this example, the vessel location validation apparatus may determine that the location information received from the vessel is invalid, and may detect false vessel location information.

The vessel location validation apparatus may store a location of each of the vessel 1, a vessel a and a vessel b. When the vessel 1 is located at (i, j), the vessel location validation apparatus may store −15 dBm as a value of a strength of a received signal. For example, when a wireless signal is received from each of the vessels 1, a and b, the vessel location validation apparatus may store a value of a signal strength of the received wireless signal. In this example, when a location of the vessel 1 acquired by decoding a message included in the wireless signal received from the vessel 1 is changed to the location (x, y), the vessel location validation apparatus may compare values of a signal strength of the received wireless signal and may determine that the signal strength is reduced from −15 dBm corresponding to the location (i, j) to −25 dBm corresponding to the location (x, y). Also, a distance between the location (x, y) and the vessel location validation apparatus may be calculated to be less than a distance between the location (i, j) and the vessel location validation apparatus.

Also, the vessel location validation apparatus may determine the location (x, y) of the vessel 1 acquired by decoding the message included in the wireless signal as invalid information, and may also determine that an actual location of the vessel 1 is further away than the location (i, j) from the vessel location validation apparatus.

Figure 6:
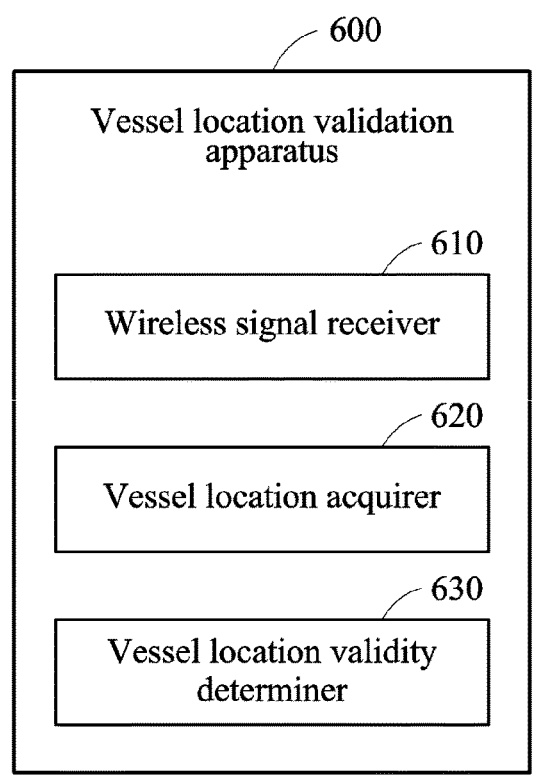
FIG. 6 is a block diagram illustrating a vessel location validation apparatus according to an embodiment.

FIG. 6 is a block diagram illustrating a vessel location validation apparatus 600 according to an embodiment.

Referring to FIG. 6, the vessel location validation apparatus 600 may include a wireless signal receiver 610, a vessel location acquirer 620, and a vessel location validity determiner 630.

The wireless signal receiver 610 may receive a wireless signal from a vessel.

The vessel location acquirer 620 may acquire location information of the vessel from the received wireless signal. The vessel location acquirer 620 may decode a message included in the received wireless signal and may extract a location and identification information of the vessel. For example, the vessel location acquirer 620 may generate a moving route corresponding to the extracted identification information based on stored location information of the vessel. In this example, the vessel location acquirer 620 may match a signal strength of the received wireless signal to location information of the vessel corresponding to the extracted identification information.

The vessel location validity determiner 630 may determine whether location information acquired based on the signal strength is valid. For example, the vessel location validity determiner 630 may compare values of a change in the acquired location information and compare values of a change in the signal strength. The vessel location validity determiner 630 may compare the values of the change in the acquired location information based on a moving distance of the vessel according to a period. Also, the vessel location validity determiner 630 may compare a distance between locations corresponding to the change in the acquired location information to a threshold of the moving distance of the vessel.

The vessel location validity determiner 630 may determine whether the acquired location information is valid based on a result of the comparing. For example, when the distance is greater than or equal to the threshold, the vessel location validity determiner 630 may determine that the acquired location information is invalid. When the values of the change in the signal strength are greater than or equal to a threshold that is based on the change in the acquired location information, the vessel location validity determiner 630 may determine that the acquired location information is invalid.

The vessel location validation apparatus 600 may further include a validity outputter (not shown), depending on circumstances.

The validity outputter may output a determination result acquired by the vessel location validity determiner 630 determining whether the location information is valid. Also, the validity outputter may transmit the determination result to an apparatus for processing a location of the vessel as information.

Figure 7:
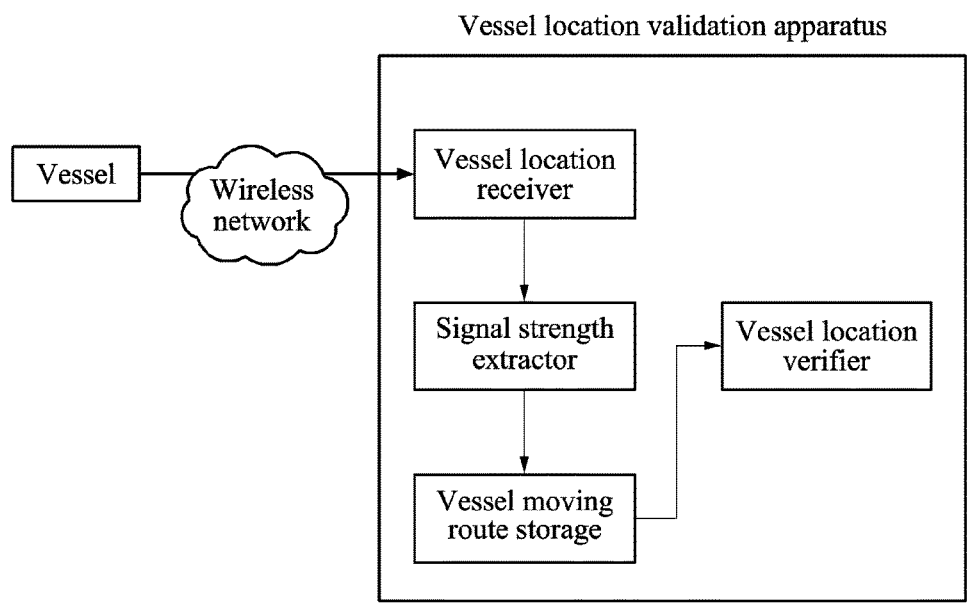
FIG. 7 illustrates a vessel location validation apparatus according to an embodiment.

FIG. 7 illustrates a vessel location validation apparatus according to an embodiment.

The vessel location validation apparatus of FIG. 7 may be configured to validate location information transmitted by a vessel.

Referring to FIG. 7, the vessel location validation apparatus may include a vessel location receiver, a signal strength extractor, a vessel moving route storage, and a vessel location verifier. The vessel location receiver, the signal strength extractor, the vessel moving route storage, and the vessel location verifier may include at least one of a memory, a processor and a data transceiver, however, there is no limitation thereto.

The vessel location receiver may receive a wireless signal including location information of the vessel. The signal strength extractor may extract a signal strength of the received wireless signal.

The vessel moving route storage may store the location information and the extracted signal strength. The vessel location verifier may verify the location information by analyzing a moving route of the vessel and determining whether the signal strength is abnormal, based on stored location information and the extracted signal strength.

According to embodiments, forged vessel location information may be excluded by determining whether location information transmitted by a vessel is valid. Thus, it is possible to increase reliability of a maritime safety system, for example, an optimum waterway calculation system operating based on vessel location information, a system for notifying a collision between vessels in advance or a vessel monitoring system.

The methods according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few embodiments of the present disclosure have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A vessel location validation method comprising:
receiving a wireless signal from a vessel at a receiver coupled to a vessel location validation apparatus;
acquiring location information of the vessel from a message comprised in the received wireless signal; and
determining whether the acquired location information is valid, based on the acquired location information and a signal strength of the received wireless signal,
wherein the determining of whether the acquired location information is valid comprises:
comparing values of a change in the acquired location information and values of a change in the signal strength; and
determining whether the acquired location information is valid based on a result of the comparing.

2. The vessel location validation method of claim 1, wherein the comparing of the values comprises comparing the values of the change in the acquired location information based on a moving distance of the vessel according to a period.

3. The vessel location validation method of claim 1, wherein the comparing of the values comprises comparing a distance between locations corresponding to the change in the acquired location information to a threshold of a moving distance of the vessel.

4. The vessel location validation method of claim 3, wherein the determining of whether the acquired location information is valid comprises, when the distance is greater than or equal to the threshold, determining that the acquired location information is invalid.

5. The vessel location validation method of claim 1, wherein the determining of whether the acquired location information is valid comprises, when the values of the change in the signal strength are greater than or equal to a threshold that is based on the change in the acquired location information, determining that the acquired location information is invalid.

6. The vessel location validation method of claim 1, wherein the acquiring of the location information comprises decoding a message included in the received wireless signal and extracting a location and identification information of the vessel.

7. The vessel location validation method of claim 6, wherein the acquiring of the location information comprises generating a moving route corresponding to the extracted identification information based on the location.

8. The vessel location validation method of claim 6, wherein the acquiring of the location information comprises matching the signal strength to location information of the vessel corresponding to the extracted identification information.

9. A vessel location validation method comprising:
    receiving a wireless signal from a vessel at a wireless receiver coupled to a vessel location validation apparatus;
    acquiring location information of the vessel from a message comprised in the received wireless signal;
    determining whether a moving route of the vessel is abnormal based on the acquired location information; and
    determining whether the location information is valid based on whether the moving route is abnormal,
    wherein the determining of whether the moving route is abnormal comprises, when a signal strength of the received wireless signal rapidly changes even though a location of the vessel remains unchanged, when the signal strength remains unchanged even though the location of the vessel changes, when the signal strength increases even though a distance to the vessel increases, or when the signal strength decreases even though the distance to the vessel decreases, determining that the moving route is abnormal.

10. The vessel location validation method of claim 9, wherein the determining of whether the moving route is abnormal comprises, when a moving distance of the vessel during a predetermined period of time is analyzed to exceed a maximum moving distance of the vessel during the predetermined period of time, determining that the moving route is abnormal.

11. The vessel location validation method of claim 9, wherein the signal strength is extracted by measuring a received signal strength indicator (RSSI) value of the received wireless signal, and
    wherein the moving route is stored as history information including a reception time at which the location information is received, identification information of the vessel, the location information of the vessel, and the extracted signal strength.

12. The vessel location validation method of claim 9, wherein the determining of whether the location information is valid comprises, when an abnormal degree of a moving distance of the vessel and an abnormal degree of a signal strength of the received wireless signal are greater than or equal to preset thresholds, determining that the location information is invalid.

13. A vessel location validation apparatus comprising:
    a wireless signal receiver configured to receive a wireless signal from a vessel;
    a vessel location acquirer configured to acquire location information of the vessel from a message comprised in from the received wireless signal; and
    a vessel location validity determiner configured to determine whether the acquired location information is valid, based on the acquired location information and a signal strength of the received wireless signal,
    wherein the vessel location validity determiner compares values of a change in the acquired location information and values of a change in the signal strength and determines whether the acquired location information is valid based on a result of the comparing.

* * * * *